(12) United States Patent
Chang

(10) Patent No.: US 6,451,744 B1
(45) Date of Patent: Sep. 17, 2002

(54) BUSHING ASSEMBLY HAVING AN INBUILT LUBRICATING MEMBER

(75) Inventor: Yung Chung Chang, Chong Ho City (TW)

(73) Assignee: Taiwan Oiles Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 09/876,870

(22) Filed: Jun. 8, 2001

(51) Int. Cl.[7] .............................. F01M 1/06; F16C 33/10
(52) U.S. Cl. .................. 508/106; 588/108; 184/6.8; 184/7.1; 384/290
(58) Field of Search ..................... 508/108, 106; 184/7.1

(56) References Cited

U.S. PATENT DOCUMENTS

| | | | |
|---|---|---|---|
| 3,944,026 A | * 3/1976 | Rhodes | 184/7.1 |
| 4,317,599 A | * 3/1982 | Anderson | 308/187 |
| 4,326,605 A | * 4/1982 | Conti | 184/15 R |
| 5,415,791 A | * 5/1995 | Chou et al. | 252/12 |
| 6,015,775 A | * 1/2000 | Takayama et al. | 508/103 |
| 6,068,931 A | * 5/2000 | Adam et al. | 428/469 |
| 6,159,909 A | * 12/2000 | Konig | 508/108 |
| 6,273,051 B1 | * 8/2001 | Paty | 123/196 R |

* cited by examiner

Primary Examiner—Ellen M. McAvoy

(57) ABSTRACT

A bushing device includes a spindle, a sleeve slidably engaged on the spindle, and a lubricating collar disposed on the inner peripheral portion of the sleeve for slidably engaging onto the spindle and for lubricating the sliding movement between the sleeve and the spindle. The lubricating collar may be made of nylon powder, sulfurous tungsten, and calcium fluoride, and may be directly secured onto the inner peripheral portion of the sleeve with such as a molding or heating process, without additional adhering process or without additional adhesive materials.

1 Claim, 6 Drawing Sheets

BUSHING ASSEMBLY HAVING AN INBUILT LUBRICATING MEMBER

BACKGROUND OF THE INVENTION

1. Field of the Invention

The present invention relates to a bushing assembly, and more particularly to a bushing assembly having an inbuilt lubricating member.

2. Description of the Prior Art

Typical bushing assemblies comprise a sleeve or a bushing 71 slidably engaged on a spindle 70. A grease or oil material 72 is required to be introduced or filled onto the spindle 70 and to be engaged between the bushing 71 and the spindle 70, by a container 73, for lubricating the sliding movement between the bushing 71 and the spindle 70. However, the grease or the oil material 72 may be forced to move outward of the bushing 71 after use, such that the spindle 70 may include a number of scrapes or scratches 74 formed thereon after use, which may greatly reduce the working life of the bushing assembly.

The present invention has arisen to mitigate and/or obviate the afore-described disadvantages of the conventional bushing assemblies.

SUMMARY OF THE INVENTION

The primary objective of the present invention is to provide a bushing assembly including an inbuilt lubricating member for lubricating the members or the parts without introducing additional grease or oil or the like.

In accordance with one aspect of the invention, there is provided a bushing assembly comprising a spindle, a sleeve slidably engaged on the spindle, the sleeve including an inner peripheral portion, and a lubricating collar provided on the inner peripheral portion of the sleeve for slidably engaging into the spindle and for lubricating a sliding movement between the sleeve and the spindle.

The lubricating collar is made of nylon powder, sulfurous tungsten, and calcium fluoride, and may be directly formed or applied or attached or secured onto the inner peripheral portion of the sleeve with such as a molding process or a heating process, or a molding and heating process, without additional adhering process or without additional adhesive materials.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
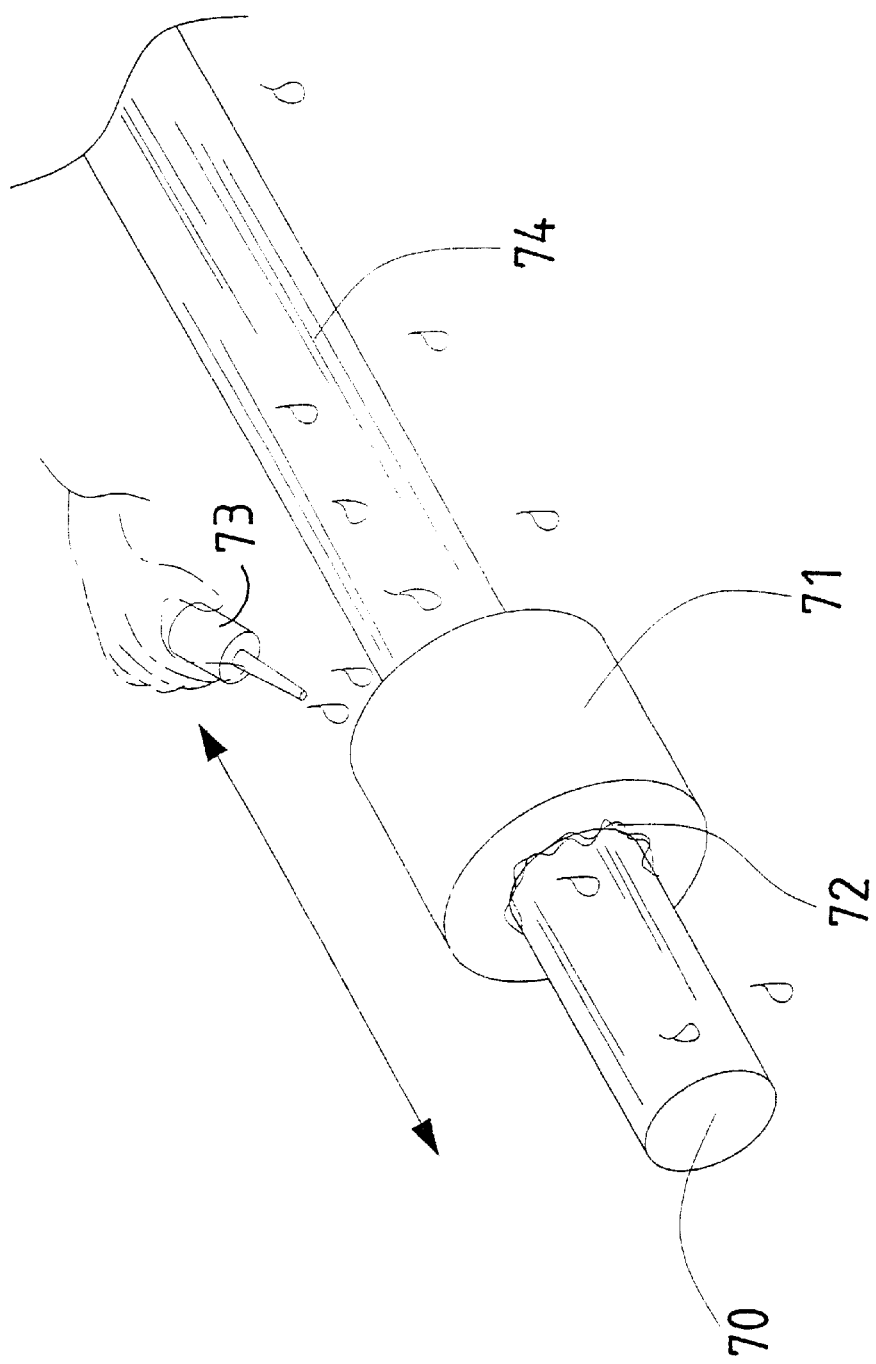
FIG. 1 is a perspective view of a typical bushing assembly.
Figure 2:
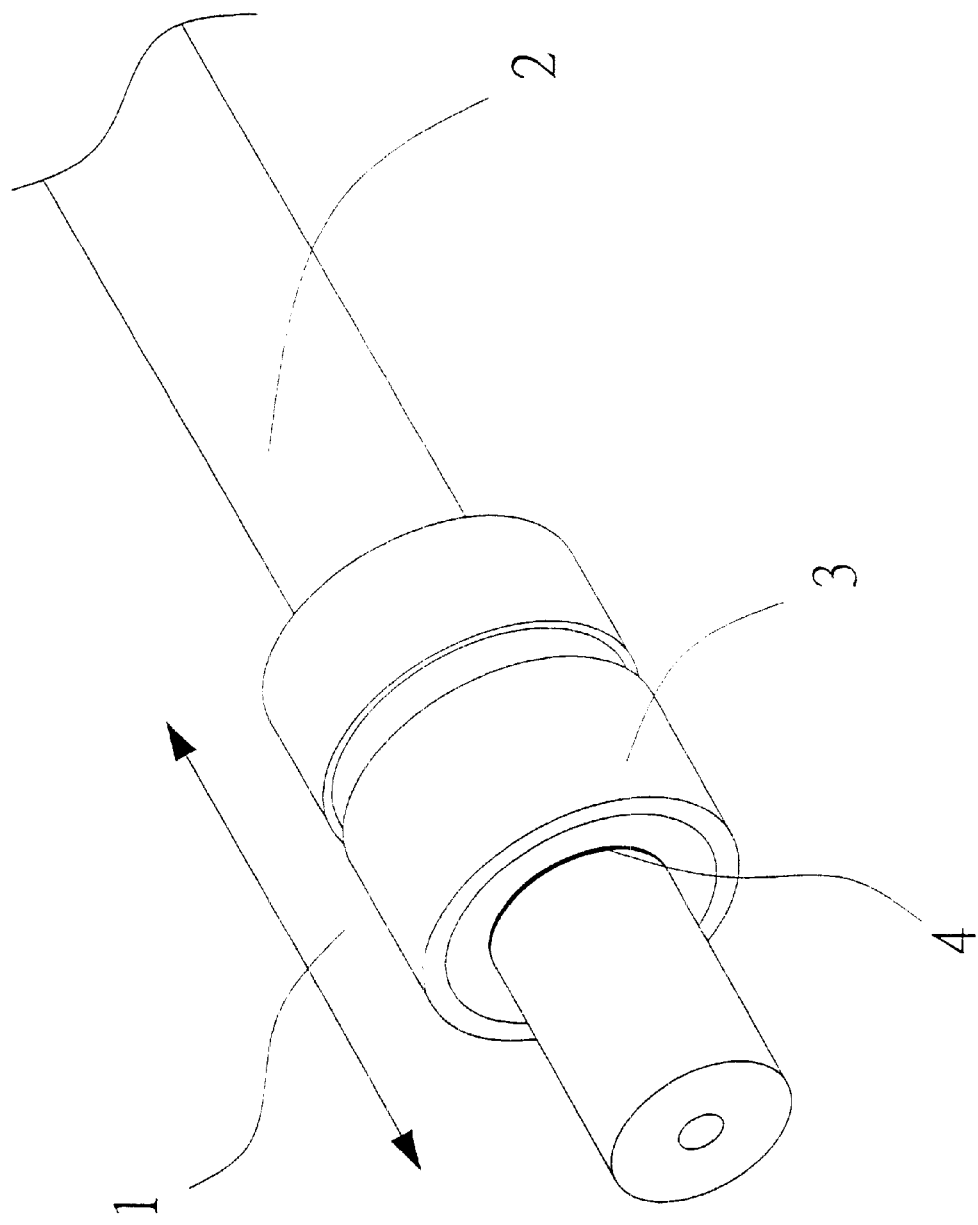
FIG. 2 is a perspective view of a bushing assembly in accordance with the present invention.
Figure 3:
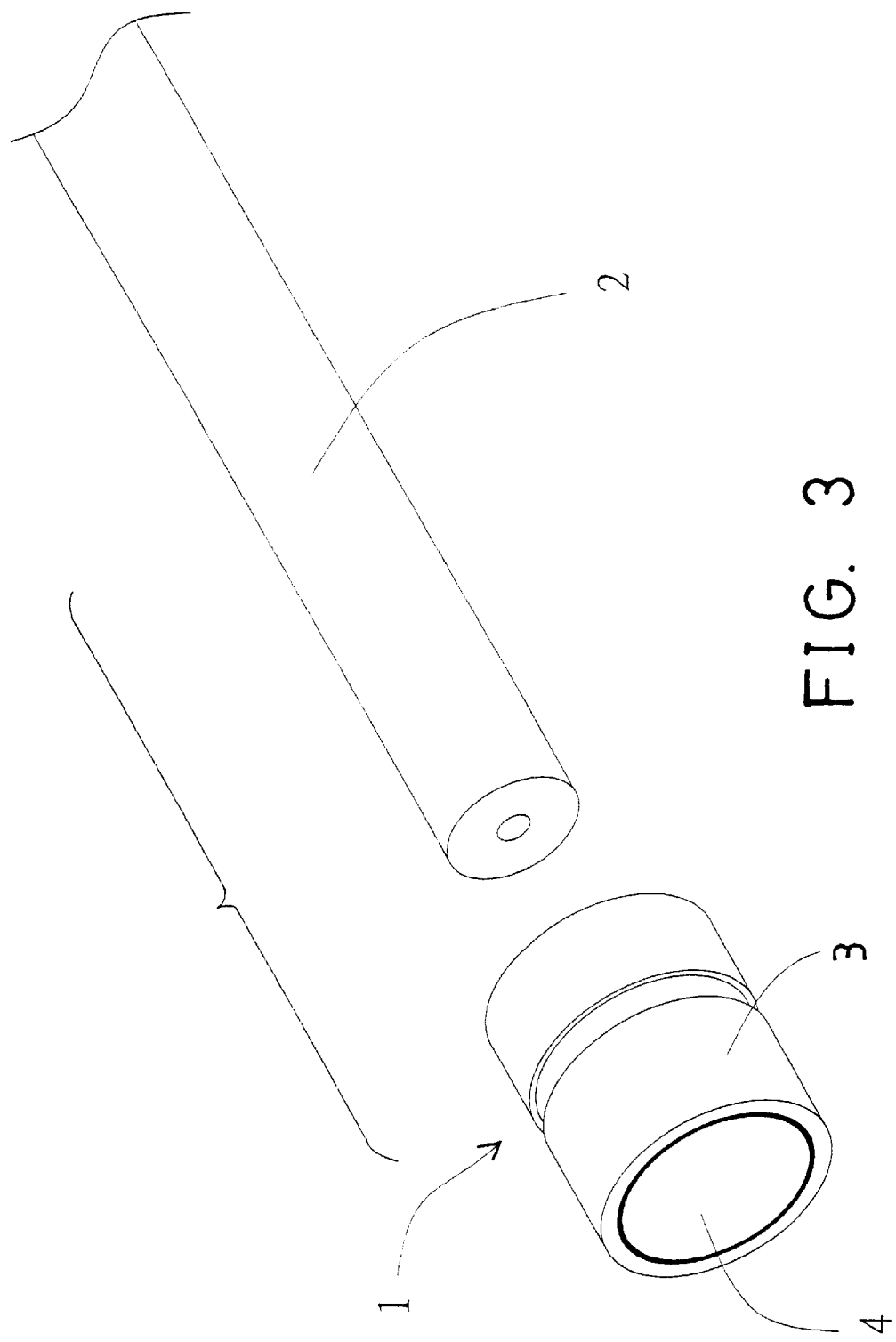
FIG. 3 is an exploded view of the bushing assembly.
Figure 4:
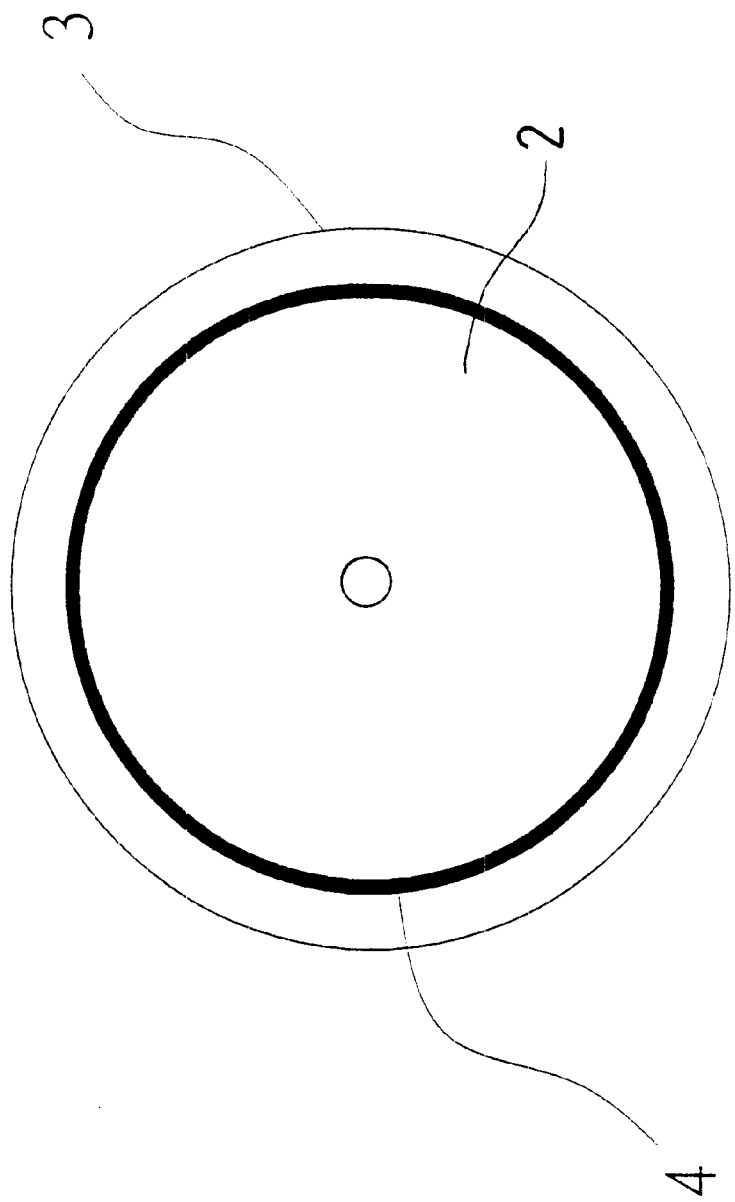
FIG. 4 is an end view of the bushing assembly.

Referring to the drawings, and initially to FIGS. 2–4, a bushing assembly 1 in accordance with the present invention comprises a barrel or a bushing or a sleeve 3 slidably engaged on a spindle 2, and a lubricating collar 4 secured or applied or formed in the inner peripheral portion of the sleeve 3 for slidably engaging with the spindle 2 and for lubricating the sliding movement between the sleeve 3 and the spindle 2. The lubricating collar 4 is solidly attached or provided or secured in the inner peripheral portion of the sleeve 3 and thus will not be disengaged from the sleeve 3 and may be solidly and slidably engaged between the sleeve 3 and the spindle 2 whenever the sleeve 3 is slid on the spindle 2.

Figure 5:
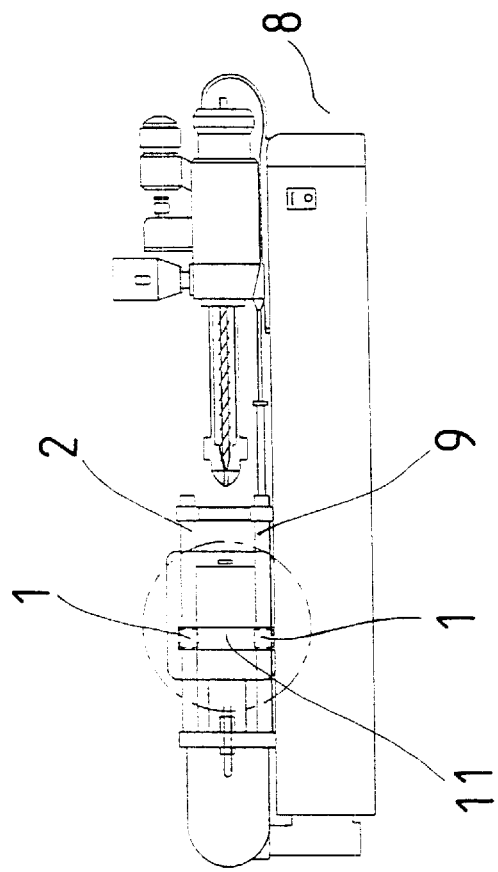
FIG. 5 is a plane schematic view illustrating a machine having one or more bushing assemblies in accordance with the present invention provided or applied therein.
Figure 6:
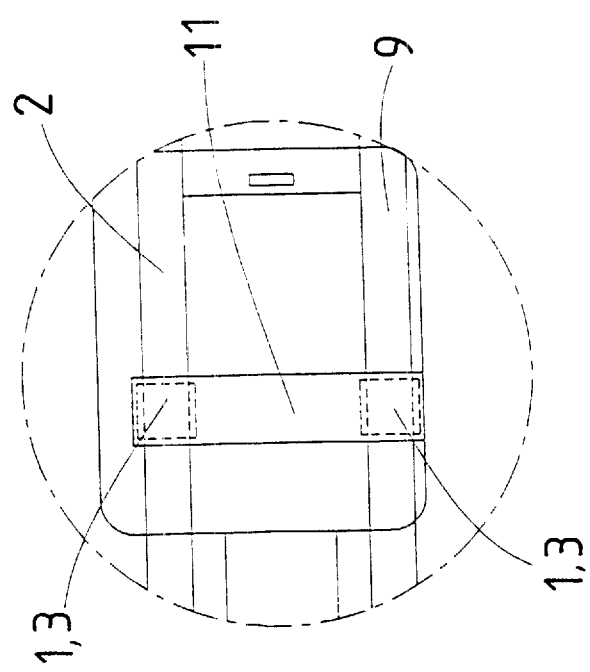
FIG. 6 is an enlarged partial plane schematic view illustrating the operation of the bushing assemblies in the machine.

In operation, as shown in FIGS. 5 and 6, the machine 8, such as the lathe, the milling or grinding machines, etc., may include one or more spindles 2, 9 provided therein. A sliding member or a seat 11 may include one or more bushing assemblies 1 attached thereon for slidably engaged on the spindles 2, 9 respectively. The lubricating collar 4 may be solidly and slidably engaged between the spindle 2 and the sleeve 3 and will not be disengaged from the sleeve 3 and the spindle 2, such that the lubricating collar 4 may be used for suitably lubricating the sliding movement between the sleeve 3 and the spindle 2 and for smoothly supporting or securing the seat 11 on the spindles 2, 9.

Figure 7:
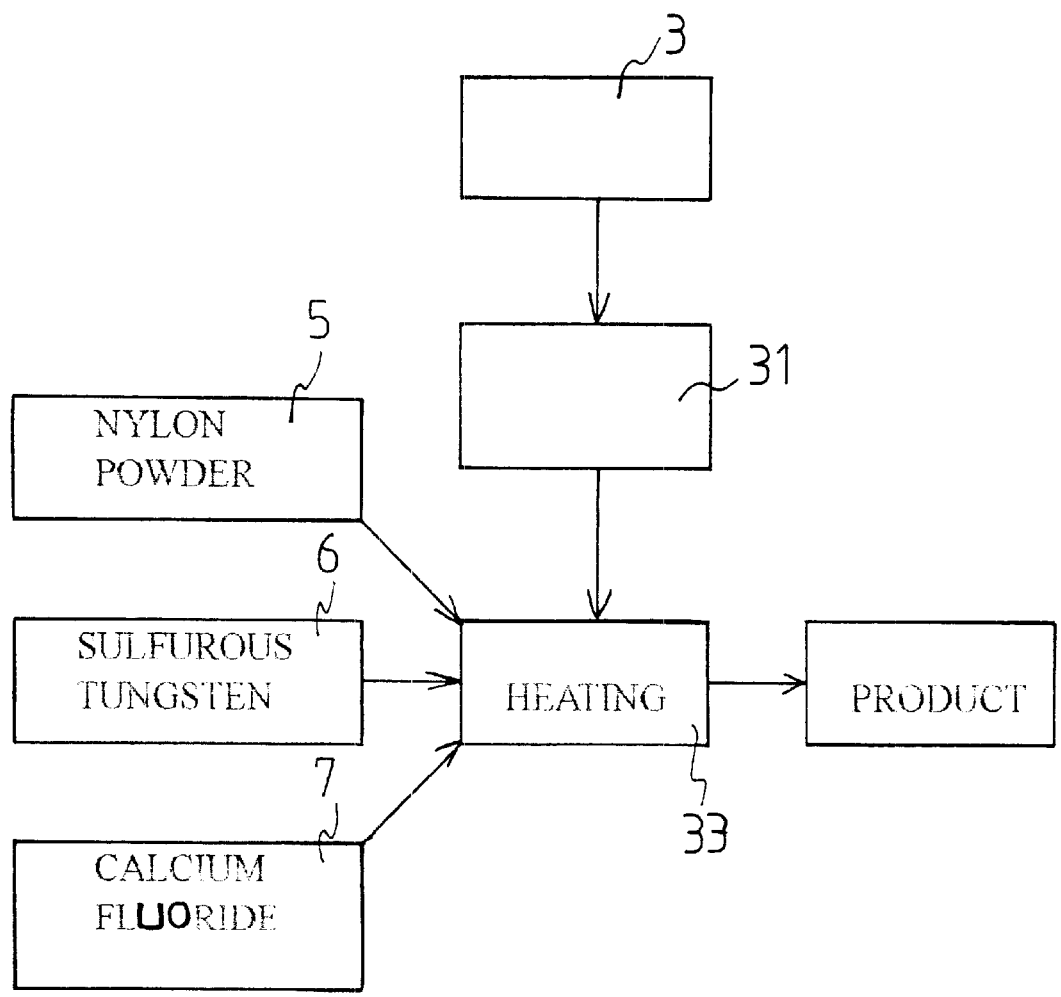
FIG. 7 is a block diagram illustrating the formation or the manufacturing of the bushing assembly.

Referring next to FIG. 7, the sleeve 3 may be manufactured or formed with various kinds of surface treatments 31, such as heat treatment, electroplating, etc. The collar 4 is preferably made of nylon powder 5, sulfurous tungsten 6, calcium fluoride 7, or the other materials, which may be formed or applied or attached or secured onto the inner peripheral portion of the sleeve 3 with such as a molding process or a heating process, or a molding and heating process 33. The materials 5, 6, 7 may be secured in the sleeve 3 with the molding or heating process 33, without additional adhesive materials. However, if required, the collar 4 may also be formed separately and then attached into the sleeve 3, with such as a force-fitted engagement, or with an adhesive material, or by a welding process, or the like.

Accordingly, the bushing assembly in accordance with the present invention includes an inbuilt lubricating member for lubricating the members or the parts without introducing additional grease or oil or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bushing assembly comprising:
  a spindle,
  a sleeve slidably engaged on said spindle, said sleeve including an inner peripheral portion, and
  lubricating collar provided on said inner peripheral portion of said sleeve for slidably engaging into said spindle and for lubricating a sliding movement between said sleeve and said spindle, said lubricating collar being made of nylon powder, sulfurous tungsten, and calcium fluoride.

* * * * *